United States Patent
Tsubouchi et al.

(10) Patent No.: US 8,397,981 B2
(45) Date of Patent: Mar. 19, 2013

(54) TELEVISION RECEIVER AND METHOD FOR MANAGING DEVICE-SPECIFIC INFORMATION

(75) Inventors: Akinori Tsubouchi, Takarazuka (JP); Mitsuteru Tatebe, Higashiosaka (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 283 days.

(21) Appl. No.: 12/471,812

(22) Filed: May 26, 2009

(65) Prior Publication Data
US 2009/0294522 A1 Dec. 3, 2009

(30) Foreign Application Priority Data
May 27, 2008 (JP) ................................. 2008-137679

(51) Int. Cl.
*G06F 17/00* (2006.01)
(52) U.S. Cl. ...................................................... 235/375
(58) Field of Classification Search .................. 235/492, 235/472.01, 380, 462.01, 375
See application file for complete search history.

(56) References Cited

U.S. PATENT DOCUMENTS

| 5,767,896 A * | 6/1998 | Nemirofsky .................... 725/23 |
| 7,044,368 B1 * | 5/2006 | Barron ........................... 235/380 |
| 7,346,376 B2 * | 3/2008 | Hamamura et al. ........ 455/575.3 |
| 2002/0191108 A1 | 12/2002 | Ko |

FOREIGN PATENT DOCUMENTS

| JP | 3353363 B2 | 12/2002 |
| JP | 2003-005733 A | 1/2003 |
| JP | 2004-333860 A | 11/2004 |

OTHER PUBLICATIONS

Japanese Office Action dated Jun. 19, 2012, issued in corresponding Japanese Patent Application No. 2008-137679 (2 pages).

* cited by examiner

*Primary Examiner* — Jamara Franklin
(74) *Attorney, Agent, or Firm* — Westerman, Hattori, Daniels & Adrian, LLP

(57) ABSTRACT

An electronic device includes a memory storing device-specific information, a display portion, and a control portion that reads the device-specific information from the memory and displays it on the display portion in a form automatically readable (e.g., bar-code form) by an external reading device (e.g., bar-code reader).

4 Claims, 6 Drawing Sheets

US 8,397,981 B2

TELEVISION RECEIVER AND METHOD FOR MANAGING DEVICE-SPECIFIC INFORMATION

This nonprovisional application claims priority under 35 U.S.C. §119(a) on Patent Application No. 2008-137679 filed in Japan on May 27, 2008, the entire contents of which are hereby incorporated by reference.

BACKGROUND OF THE INVENTION

1. Field of the Invention

The present invention relates to an electronic device. More specifically, the present invention relates to an electronic device having device-specific information stored in an internal memory, and to a method for managing device-specific information.

2. Description of Related Art

A manufacturer of electronic devices creates an internal management database by use of identification numbers (for example, serial numbers) that are assigned uniquely to electronic devices respectively. Such an internal management database can identify dates of manufacture and specifications from identification numbers, and is used to cope with inquiries from users.

Conventionally, a user can only know the identification number of an electronic device by looking at the label bearing the identification number which is affixed on the body of the electronic device, or by looking at the warranty card or the like bearing the identification number which comes with the electronic device. A label bearing an identification number is typically affixed to a side or rear face of an electronic device, and this makes it difficult for a user to know an identification number by means of a label bearing it. A warranty card or the like bearing an identification number may be lost, or may be stored away a user do not remember where, and this makes it as difficult for a user to know an identification number by means of a warranty card or the like bearing it.

There has been proposed a television receiver that overcomes those problems. This television receiver has a storage means for storing a serial number and, when it is in a service mode for maintenance, the television reads the serial number from the storage means and displays it on the screen of a CRT (cathode ray tube). With this television receiver, since the serial number is displayed on the CRT screen, it is easy for a user to know the serial number.

The above television receiver can be generalized to realize electronic devices that have a memory for storing an identification number and that display the serial number stored in the memory on the display screen of a display as necessary.

A manufacturer of such electronic devices—those that have a memory for storing an identification number and that display the serial number stored in the memory on the display screen of a display as necessary—needs to verify whether or not the identification numbers written in the memories of the electronic devices are correct. This verification is performed by checking the identification numbers written in the memories of electronic devices against an internal management database.

Inconveniently, however, in the checking of the identification numbers written in the memories of electronic devices against an internal management database, if the checking relies on a checking person visually checking the identification numbers displayed on the display screen of displays, errors ascribable to human mistakes (failure to verify identification numbers resulting from a checking person reading them incorrectly) may occur.

SUMMARY OF THE INVENTION

An object of the present invention is to provide an electronic device, and a method for managing device-specific information, free from errors ascribable to human mistakes in management of device-specific information.

To achieve the above object, according to the present invention, an electronic device is provided with a memory that stores device-specific information, a display portion, and a control portion that reads the device-specific information from the memory and displays the device-specific information on the display portion in a form automatically readable (for example, a form of a bar-code) by an external reading device (for example, a bar-code reader).

Moreover, to achieve the above object, according to the present invention, a method of managing device-specific information includes: a step of saving device-specific information to a memory of an electronic device; a step of creating database related to a plurality of electronic devices by use of the device-specific information; a step of reading the device-specific information from the memory and displaying the device-specific information on a display portion of the electronic device in a form automatically readable by an external reading device; a step of reading the device-specific information by the external reading device; and a step of checking the device-specific information read by the external reading device against the database.

According to the present invention, since device-specific information is read from the memory of an electronic device and the device-specific information is displayed on the display portion of the electronic device in a form automatically readable by an external reading device, it is possible to read the device-specific information by an external reading device. Thus, it is possible to prevent errors ascribable to human mistakes in management of device-specific information.

DETAILED DESCRIPTION OF PREFERRED EMBODIMENTS

An embodiment of the present invention will now be described with reference to the accompanying drawings. As an electronic device according to the invention, here, a television receiver that operates normally only when a first lock release code previously stored in a memory matches a second lock release code inputted from an input device is taken up as an example. Since legal owners (those who obtained the device by legitimate purchase) can obtain the correct second lock release code at a store etc., they can use the television receiver without problem. However, illegal owners (those who obtained the device otherwise than by legitimate purchase) cannot input the correct second lock release code, and thus cannot operate the television receiver normally; thus the television receiver is theftproof.

Figure 1:
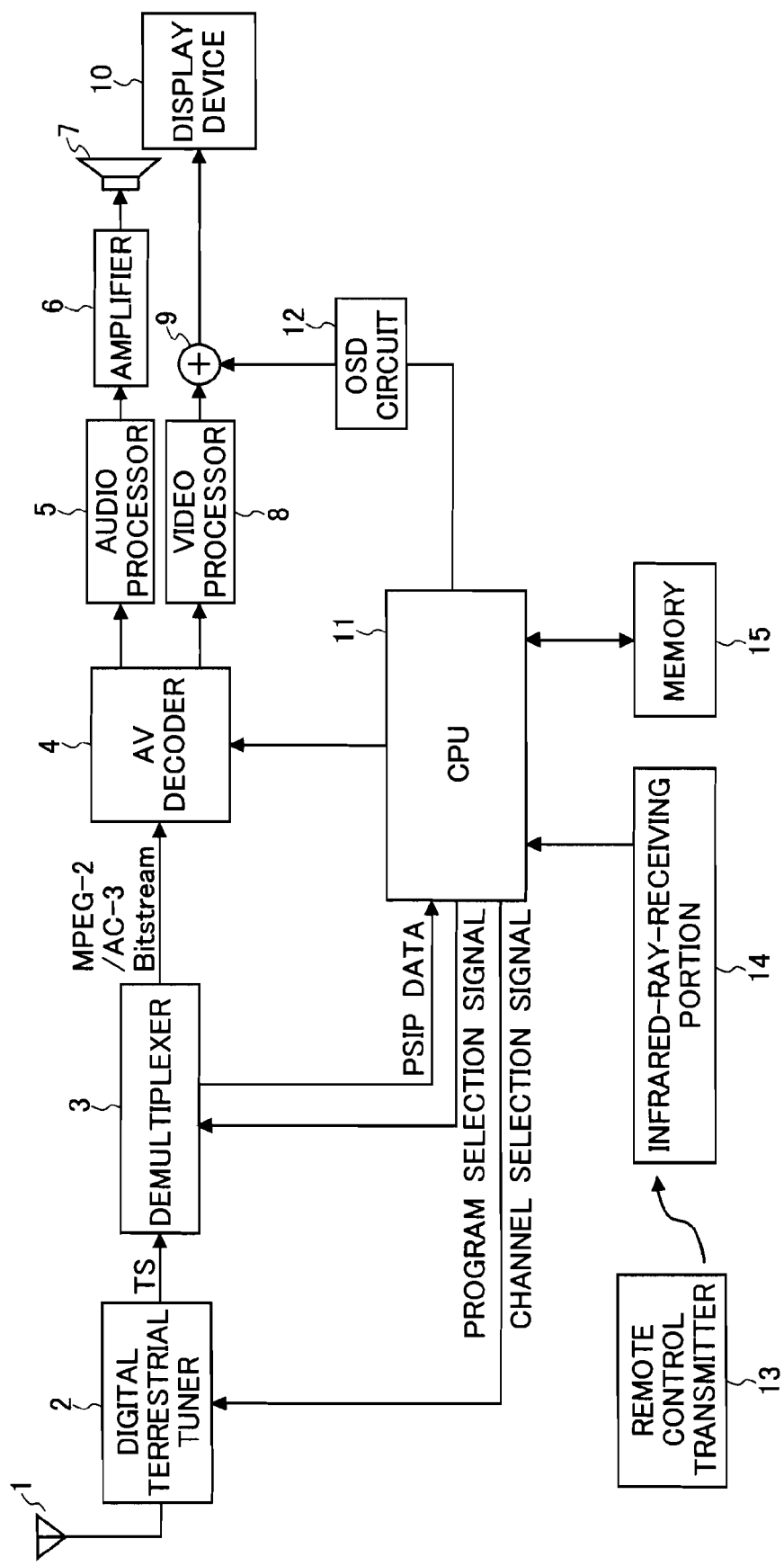
FIG. 1 is a block diagram of a television receiver according to an embodiment of the present invention.

FIG. 1 is a block diagram of a television receiver 100 according to an embodiment of the present invention. In this embodiment, an U.S. digital television receiver receiving an ATSC (advanced television systems committee) signal will be described.

A ground antenna 1 receives digital terrestrial broadcast waves and supplies the received signal to a digital terrestrial tuner 2. The digital terrestrial tuner 2 selects a physical channel according to a channel selection signal fed from a CPU (central processing unit) 11. Note that instead of the CPU, a microprocessor may be used. The digital terrestrial tuner 2, through this channel selection process, converts a high-frequency 8VSB (8-level vestigial sideband) modulated signal including video/audio data to a signal with a predetermined frequency. Moreover, the digital terrestrial tuner 2 is provided with, among others, an 8VSB demodulation circuit that demodulates the digital modulated signal of the selected physical channel, and outputs a transport stream TS.

A demultiplexer (DEMUX) 3 divides the transport stream TS received from the digital terrestrial tuner 2 into predetermined packets, namely an MPEG-2 video stream, an AC-3 (AC-3 is a registered trademark of Dolby Laboratories Licensing Corporation, Ltd, America) audio stream, and a PSIP (program and system information protocol) data. Moreover, the demultiplexer 3 receives a program selection signal from the CPU 11. The demultiplexer 3 supplies the video stream and the audio stream to an AV (audio video) decoder 4, and supplies the PSIP data including program information to the CPU 11.

The CPU 11 not only processes the PSIP data, but also performs various kinds of control of the television receiver 100 and processes a remote control signal, which will be described later. A memory 15 is a rewritable nonvolatile memory (for example, an EEPROM (electrically erasable and programmable read only memory), a flash memory, etc.) connected to the CPU 11, and stores various kinds of data including program information, an identification number (for example, a serial number), a lock release code, and a flag (hereinafter referred to as the lock release flag) that indicates whether or not a lock is released.

A plurality of virtual channels are multiplexed into the transport stream TS. By collecting a VCT (virtual channel table) from the transport stream TS and, with reference to the collected VCT, checking a predetermined packet ID, it is possible to select, among a plurality of virtual channels, any one channel.

The AV decoder 4 is provided with an MPEG video decoder (unillustrated) that decodes the MPEG-2 bitstream, and an AC-3 decoder (unillustrated) that decodes the audio stream (AC-3 bitstream). The video data generated by the MPEG video decoder of the AV decoder 4 is outputted to a video processor 8, and audio data is outputted to an audio processor 5.

The video processor 8 receives the video data from the AV decoder 4 and performs digital/analog conversion to generate an analog video signal. The audio processor 5 receives the audio data from the AV decoder 4 and performs digital/analog conversion to generate an analog audio signal.

An OSD (on screen display) circuit 12, based on the text information indicated by the output from the CPU 11, outputs a video signal to an adder 9. The adder 9 adds up the video signal based on bitmap data and the video signal received from the OSD circuit 12, and supplies the video signal thus obtained to a display device (for example, a slim display device) 10.

The display device 10 displays an image according to the video signal supplied from the video processor 8. On the other hand, the analog audio signal from the audio processor 5 is amplified by an amplifier 6 and is then outputted from a speaker 7.

A remote control transmitter 13 is a transmitter that transmits various instructions to the television receiver. When an input key (unillustrated in FIG. 1) provided on the remote control transmitter 13 is operated, an infrared signal (remote control signal) that is an instruction corresponding to that input key is transmitted from a light-emitting portion (unillustrated). An infrared-ray-receiving portion 14 receives the infrared signal, converts the infrared signal into an electric signal, and supplies the electric signal to the CPU 11.

In one step in the manufacturing process of the television receiver 100, an identification number (for example, a serial number) that is assigned uniquely to each unit and a lock release code are written to a memory 15. In each television receiver 100, an identification number (for example, a serial number) and a lock release code correspond, one to one, to each other. For writing the identification number and the lock release code to the memory 15, for example, an IIC (inter integrated circuit) bus may be used.

On the other hand, an internal management database using identification numbers, specifically a database in which an identification number (for example, a serial number), a lock release code, a date of manufacture, specifications, etc. are associated together, is created and stored in the internal memory of an internal management PC (personal computer).

Figure 2:
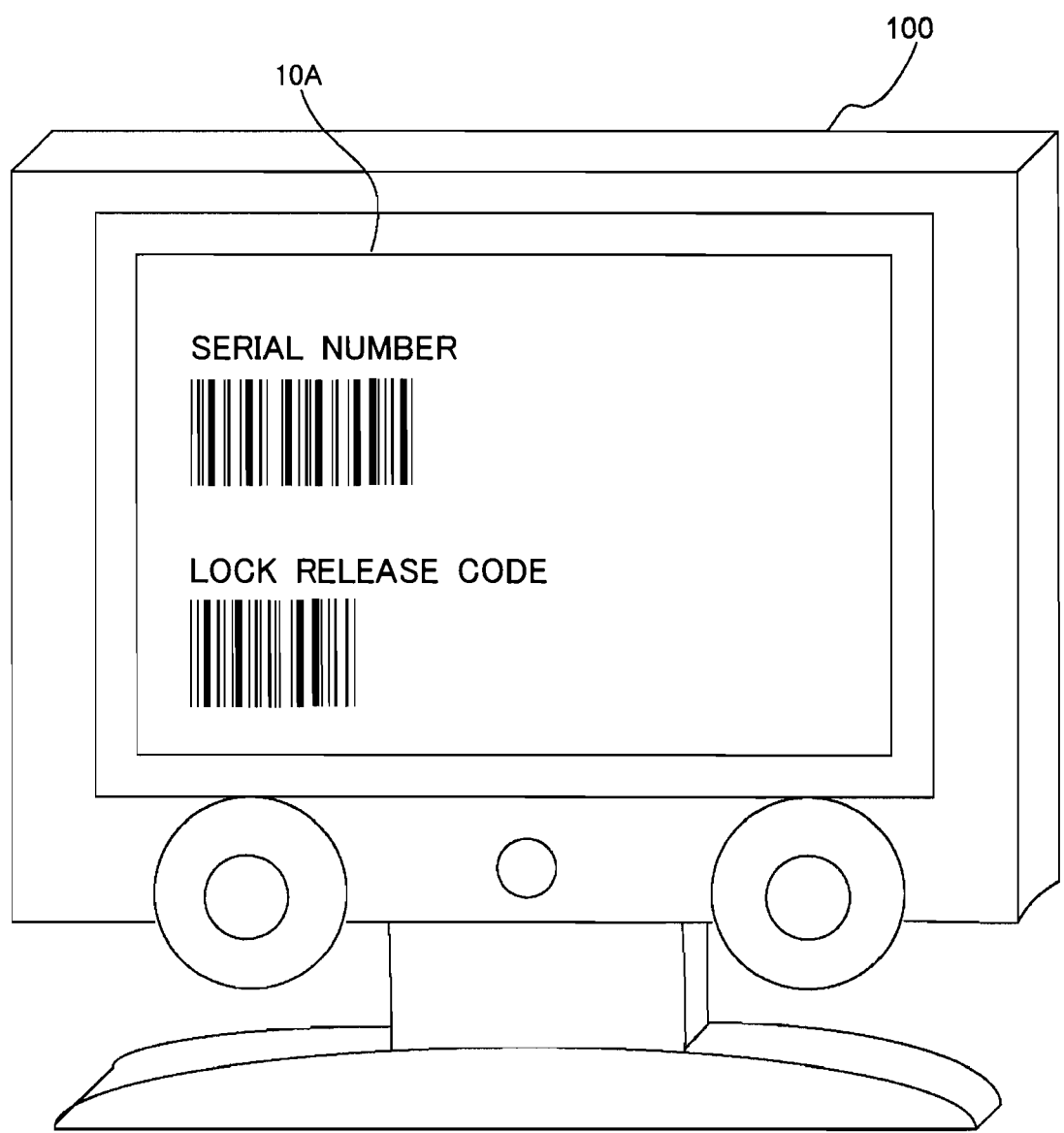
FIG. 2 is a diagram showing an example of a screen when the television receiver is in a special mode.

In a step in the manufacturing process of the television receiver 100 after the completion of writing the identification number and the lock release code to the memory 15 described above and of creating and storing the internal management database described above, when the television receiver 100 is put into a special mode, the identification number (the serial number in the example in FIG. 2) and the lock release code are read from the memory 15, and are each displayed on a display screen 10A in the form of a bar-code as shown in FIG. 2. The special mode is invoked, for example, when a maintenance person performs special operation (an in-plant-only operation that is not described in a user's manual) with input keys on the remote control transmitter 13 and the television receiver 100 receives a remote control signal transmitted from the remote control transmitter 13.

Figure 3:
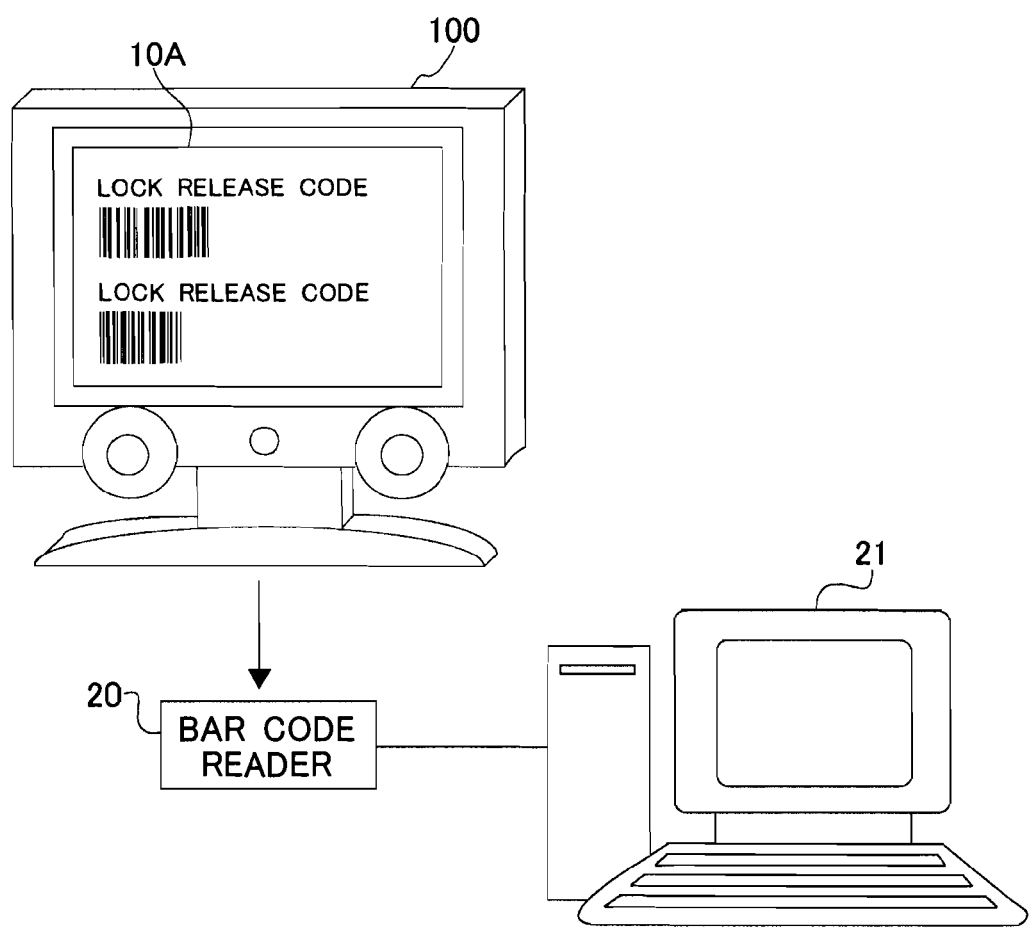
FIG. 3 is a diagram showing how an identification number and a lock release code written in a memory of the television receiver are checked against an internal management database.

As shown in FIG. 3, a bar code indicating the identification number and a bar code indicating the lock release code displayed on the display screen 10A of the television receiver 100 are read by a bar code reader 20, and the read data is captured by an internal management PC 21. The internal management PC 21 checks the data captured from the bar code reader 20 against the internal management database previously stored in the internal memory. When the data captured from the bar code reader 20 does not contradict the contents of the internal management database, the internal management PC 21 displays on its monitor screen an indication (for example, an "OK" indication) informing that the checking result is satisfactory, and adds a "checking completed" record to the relevant element in the internal management database; when the data captured from the bar code reader 20 contradicts the contents of the internal management database, the internal management PC 21 displays on its monitor screen an indication (for example, an "NG" indication) informing that the checking result is unsatisfactory. When the indication informing that the checking result is unsatisfactory is displayed on the monitor screen of the internal management PC 21, the process returns to the step of writing the identification number and the lock release code to the memory 15 of the television receiver 100, and the writing is performed again.

As described above, in the checking of the identification number and the lock release code written in the memory 15 of the television receiver 100 against the internal management database, since the identification number and the lock release code written in the memory 15 of the television receiver 100 are automatically read by the bar code reader 20, it is possible to prevent the occurrence of errors ascribable to human mistakes (failure to verify identification numbers and lock release codes resulting from a checking person reading them incorrectly).

The display form of the identification number and the lock release code in the special mode may be a form (for example, a two dimensional code), other than a bar code, that allows automatic reading. The display contents in the special mode may be one of the identification number and the lock release code alone, or may alternatively be device-specific information other than the identification number and the lock release code.

Figure 4:
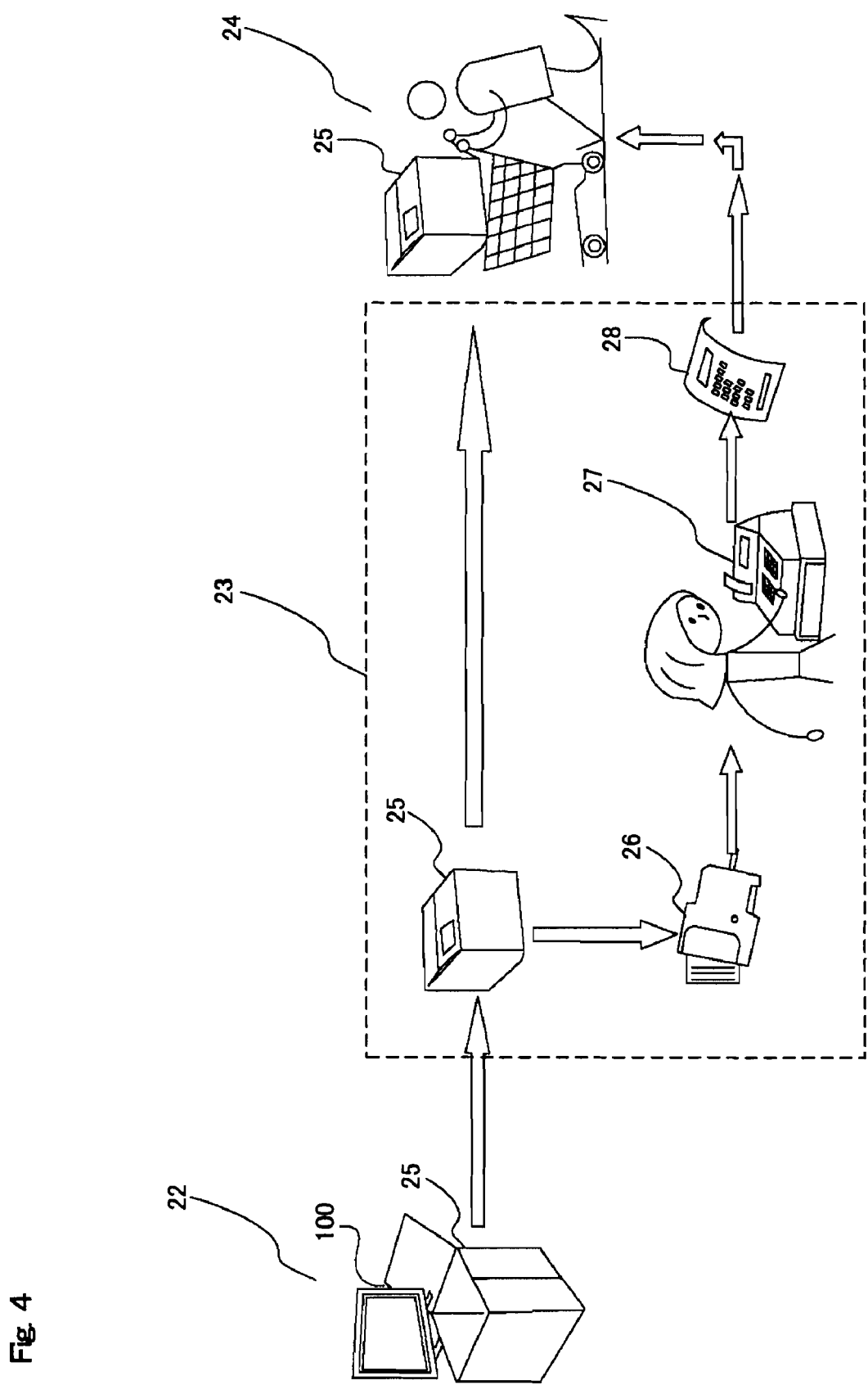
FIG. 4 is a diagram showing a procedure for issuing a lock release code.

FIG. 4 is a diagram showing the procedure for issuing a lock release code. In a manufacturing process 22, the television receiver 100 is packed. In a sales process 23, a bar code indicating an identification number (for example, a serial number) affixed on the packed television receiver 25 is read by a bar code reader 26. The read identification number (for example, the serial number) is imported into a register device 27. The register device 27 can obtain a lock release code from each identification number (for example, each serial number). The obtained lock release code is printed on a receipt 28 showing the record of purchase, which is then handed to a purchaser (a process 24).

The lock release code is not necessarily printed on a receipt; it may be given to a purchaser in any form. For example, it may be printed on a sheet of paper separate from the receipt. Moreover, the identification number (for example, the serial number) may be read by any means other than the bar code reader, and may be transmitted to the register device in any manner. For example, the identification number (for example, the serial number) may be input to the register device directly by a sales person. Moreover, instead of the identification number (for example, the serial number) being transmitted to the register device, the lock release code may be obtained by transmission of the identification number (for example, the serial number) to another device. Moreover, the time to obtain the lock release code may be anytime.

Figure 5:
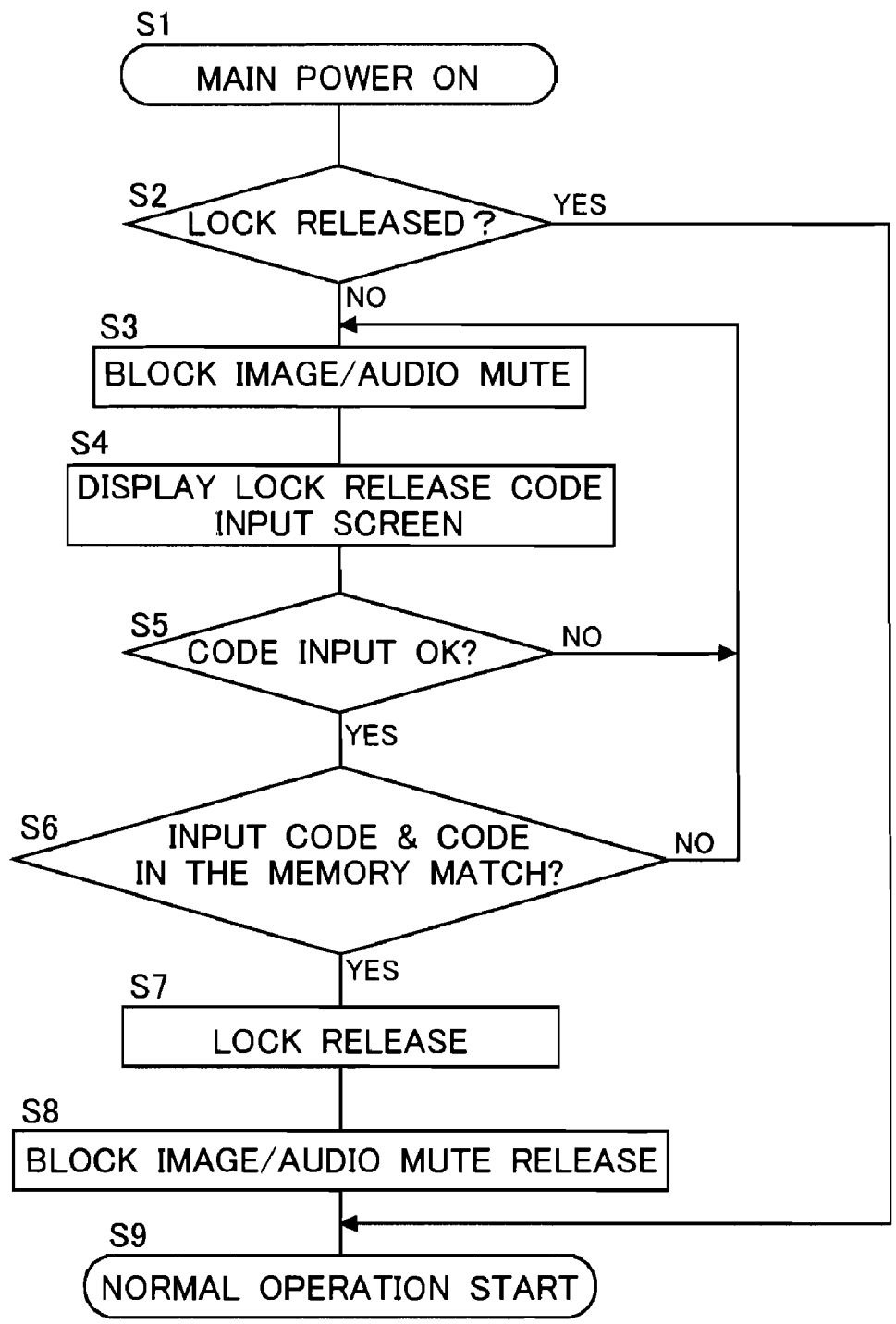
FIG. 5 is a diagram showing an example of an operation flow chart of the television receiver shown in FIG. 1.

FIG. 5 is a diagram showing an example of an operation flow chart of the television receiver shown in FIG. 1. First, the power of the television receiver is turned on (step S1), and then the CPU 11 of the television receiver, based on the lock release flag stored in the memory 15, checks whether or not the lock of video etc. is released (step S2). If it is found that the lock of video etc. is already released, the television receiver starts channel selection preset operation, video display, and audio output (step S9). On the other hand, if it is found that the lock of video etc. is not released yet, video is blocked and audio is muted (step S3).

Figure 6:
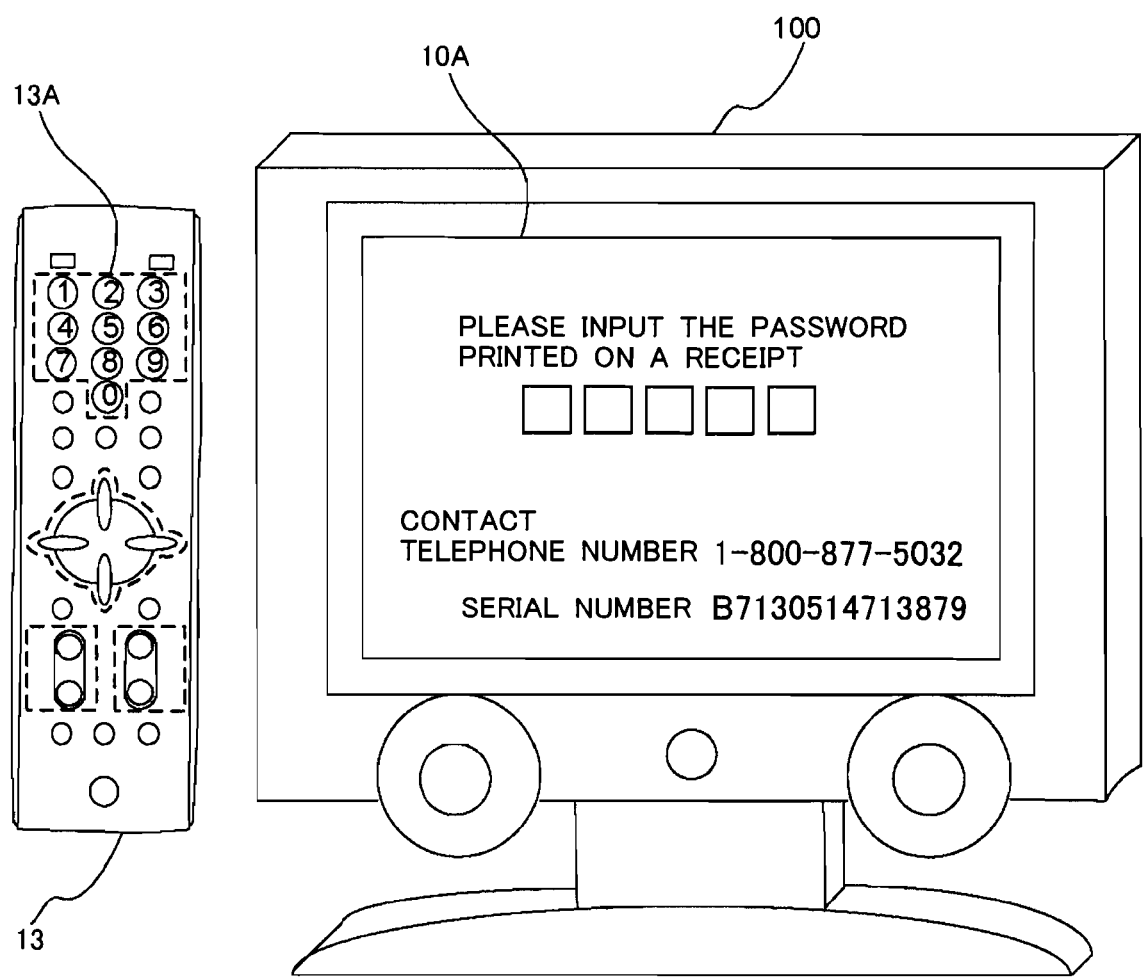
FIG. 6 is a diagram showing an example of a screen of the television receiver requesting input of a lock release code.

Thereafter, for example, an indication requesting input of a lock release code is displayed on the screen of the television receiver as illustrated in FIG. 6 (step S4). According to this indication, a user, by use of a remote control unit or the like, inputs the lock release code. Here, the television receiver checks whether there is input from the user (step S5). If there is no input, video is blocked and audio is muted (step S3).

On the other hand, if there is input, checking of whether or not the inputted lock release code matches the lock release code stored in the memory 15 is performed by the comparing portion of the television receiver (step S6). Note that, in this embodiment, the CPU 11 of the television receiver functions as the comparing portion of the television receiver.

When it is found that the inputted lock release code matches the lock release code stored in the memory 15, the lock of video and audio is released (step S7). When the lock is released, the blocking of video and the muting of audio are released (step S8), and thereby the television receiver starts channel selection preset operation, video display, and audio output (step S9).

On the other hand, if it is found that the inputted lock release code does not match the lock release code stored in the memory 15, video is blocked and audio is muted (step S3).

FIG. 6 is a diagram showing an example of a screen of the television receiver requesting input of a lock release code. FIG. 6 shows the television receiver 100 and a remote control transmitter 13 which is an example of the remote control unit. The remote control transmitter 13 has a large number of input keys 13A. The television receiver 100 has the display screen 10A. The display screen 10A displays the indication "Please input the password printed on a receipt", the indication "Contact telephone number 1-800-877-5032", and the indication "Serial number B7130514713879".

According to the indications on the display screen 10A, a user, by use of the remote control transmitter 13, inputs the lock release code. If the inputted lock release code matches the lock release code stored in the memory 15 of the television receiver 100, video is displayed on the display screen 10A. On the other hand, if the inputted lock release code does not match the lock release code stored in the memory 15 of the television receiver 100, there is no video display nor audio output. A large number of input keys 13A include a key for correcting input, a key for initializing the television receiver 100, and an approval key for approving a previously set item.

In an example shown in FIG. 6, the indications "Contact telephone number" and "Serial number" are displayed. For example, due to the receipt 28 (see FIG. 4) having a lock release code (a password) printed thereon being lost or smudged by the user, the lock release code (the password) may be unreadable. In such a case, by calling the "Contact telephone number" to contact the manufacturer and informing them of the serial number, the user can obtain the lock release code from the manufacturer.

As described above, the manufacturer creates and stores the internal management database, and thus, by hearing the identification number (the serial number) from the user, the manufacturer can tell the corresponding lock release code to the user. Moreover, the manufacturer, by use of the internal management database, monitors identification numbers (serial numbers here) and theft information in pairs to grasp which identification numbers (serial numbers here) of their products are those of stolen products; thus, if an illegal owner contacts the manufacturer, he/she cannot obtain the lock release code.

Although, in the example shown in FIG. 6, the serial number is displayed at the time of displaying the screen requesting input of the lock release code, the identification number (for example, the serial number) may be displayed anytime. For example, the identification number may be displayed when the user performs, with the remote control transmitter, a predetermined special key operation for displaying the identification number.

The means of inputting the lock release code is not particularly limited to the example described above; the lock release code may be input in any manner. For example, instead of using the remote control unit, input keys provided on the television receiver may be used. Moreover, the display screen requesting a user to input the lock release code may be in any form. For example, when there are a large number of numerals that need to be input, the display screen shows a small number of numerals (for example, three numerals) for each of the large number of numerals that need to be input, and then an input screen for the small number of numerals is displayed. Moreover, numerals may be displayed on the display screen so that, by touching the screen with the numerals displayed thereon, a user may select appropriate numerals. A column for drawing symbols and simple pictures may also be displayed on the display screen so that a user may draw information on that column.

Moreover, the television receiver may request input of a lock release code anytime. For example, it may request when the power of the television receiver is turned on or several seconds after the power thereof is turned on. Moreover, input of the lock release code may be, after inputting a large number of numerals, by use of the approval key, approved as information. In such a case, when the approval key is pressed before all of the numerals to be input are inputted, the display screen may not change and a screen to immediately continue input may be displayed.

The present invention is not limited to the embodiment described above. For example, although a television receiver alone is described with reference to FIGS. 1 to 6, the description with reference to FIGS. 1 to 6 can be applied to all sorts of electronic devices (so long as they are provided with a display portion that can display device-specific information in an automatically readable form) such as VCRs (video cassette recorders), DVD (digital versatile disc) players, camcorders, vacuum cleaners, electric heaters, air conditioners, rice cookers, digital cameras, fixed telephones, cellular phones, personal computers, and fans. Moreover, the electronic devices may be provided with a solar cell.

What is claimed is:

1. A method of managing device-specific information, the method comprising:
   a step of saving device-specific information to a memory of a television receiver;
   a step of creating a database related to a plurality of television receivers by use of the device-specific information; a step of reading the device-specific information from the memory and displaying the device-specific information on a display portion of the television receiver in a form automatically readable by an external reading device;
   a step of reading the device-specific information by the external reading device; and
   a step of checking the device-specific information read by the external reading device against the database,
   wherein the display portion has a display screen provided on a front surface of the television receiver to display an image of a television program,
   wherein the television receiver includes a speaker that outputs television program sounds,
   and wherein the television receiver includes a tuner that receives a television program signal and tunes said television program signal.

2. The method of managing device-specific information according to claim 1, wherein the device-specific information includes an identification number.

3. The method of managing device-specific information according to claim 1, wherein the automatically readable form is a form of a bar-code.

4. The method of managing device-specific information according to claim 1, wherein the television receiver further comprises:
   a first lock release code storing memory that includes a first lock release code;
   a comparing portion that compares the first lock release code with a second lock release code inputted by use of an input device; and
   a lock control portion that releases a lock and permits normal operation of the television receiver when a comparison result at the comparing portion matches.

* * * * *